United States Patent [19]
Wilde

[11] 3,776,712
[45] Dec. 4, 1973

[54] TREATMENT OF GLASS SHEET
[75] Inventor: Dennis Wilde, Hoscar, nr. Ormskirk, England
[73] Assignee: Pilkington Brothers Limited, Liverpool, Lancashire, England
[22] Filed: July 10, 1972
[21] Appl. No.: 270,161

Related U.S. Application Data
[63] Continuation of Ser. No. 56,251, July 20, 1970, which is a continuation of Ser. No. 632,795, April 21, 1967.

[30] Foreign Application Priority Data
Apr. 25, 1966  Great Britain .................. 18,074/66

[52] U.S. Cl. .................... 65/348, 65/25 A, 65/351, 65/114
[51] Int. Cl. ........................................... C03b 27/00
[58] Field of Search ..................... 65/114, 182, 348, 65/351, 25 A

[56] References Cited
UNITED STATES PATENTS
3,223,501  12/1965  Fredley et al. .................... 65/182 X
3,223,498  12/1965  Davidson, Jr. .................... 65/182 XL
3,372,016  3/1968  Rahrig et al. .......................... 65/114

Primary Examiner—Frank W. Miga
Attorney—John P. Snyder et al.

[57] ABSTRACT
Toughening of advancing glass sheets is effected in two stages; in the first the glass is supported on a gaseous support and thereafter when the underface of the glass is no longer deformable the advancing glass is mechanically supported as quenching is completed, clearance of cullet being facilitated in the final quenching stage.

3 Claims, 3 Drawing Figures

TREATMENT OF GLASS SHEET

CROSS-REFERENCES TO RELATED APPLICATIONS

This application is a continuation of U.S. Pat. application Ser. No. 56,251 filed July 20, 1970 now abandoned which is a streamlined continuation of U.S. Pat. application Ser. No. 632,795, filed Apr. 21, 1967 now abandoned.

BACKGROUND OF THE INVENTION

This invention relates to the toughening of glass sheets during which glass sheets are advanced over a gaseous support created by the sheets over a longitudinally extending bed from which supporting gas is released as the sheets are advanced over the bed.

In co-pending U.S. Pat. Application Ser. No. 632,794 of even date there is described and claimed apparatus for transporting glass sheets through heating stations on a gaseous support. Flat glass sheets are fed in sequence into the apparatus at a loading station and while they are heated up to a temperature above the deformation temperature of the glass they are supported on a cushion of gas created over the bed structure, which has gas supply apertures through which hot gases are released into the gaseous cushion and equally interspersed exhaust openings through which spent gases are exhausted from the cushion.

The bed structure, whose upper surface is interchangeable, may have a flat upper surface so that the sheets of flat glass do not undergo any change in shape as they are advanced along the bed, the advance being effected either by tilting the bed downwardly at a slight angle in the longitudinal direction, or by inclining the bed at a slight transverse angle to the horizontal so that the sheets of glass which are floating on the gaseous support cushion move into contact with edge rollers which are driven to assist the advance of the sheets along the gaseous support.

The sheets of glass may undergo a change of shape as they pass through the heating stations by embodying in the bed an interchangeable transition surface element which is transversed by the glass sheets after they are hot enough to be deformable and which initiates a progressive change of shape of the hot deformable sheets of glass to a desired curved shape.

After the heating stations the sheets may be transported on a gaseous support through a quenching station from which the sheets emerge on to a conveyor as toughened glass sheets.

The sheets of glass are quenched by directing streams of cooling air at both surfaces of the glass, so that there is a rapid cooling of the surfaces of the glass while heat is retained in the central part of the thickness of the glass. If during the quenching operation the glass should shatter, resulting in dicing of the glass, the cullet falls into the lower part of the quenching apparatus. In practice only a very small percentage of sheets of glass being quenched are lost by shattering during the quenching operation. When the glass sheets being quenched are supported in a generally horizontal disposition on a gaseous cushion created above a bed structure by the sheet of glass being toughened, such small dice of glass may block the apertures in the bed, in particular the gas exhaust apertures, as well as restricting the passage of succeeding sheets through the quenching apparatus.

The present invention is based on a novel principle of initially supporting the hot sheets of glass on a gaseous support while they are being quenched and while still in a deformable state in which dicing cannot occur, and then as soon as the glass can be mechanically supported without possibility of damage to its under surface, advancing the sheets of glass to a quenching stage in which cullet can fall away from the path of travel of the glass sheets before the next sheet arrives for quenching. It has been found that by mechanically supporting the glass on its under surface as soon as the temperature of the glass is such that no surface marring results, then mechanical support of the glass is assured before it reaches the stage in the quenching operation at which shattering of the glass can occur.

SUMMARY

According to the invention there is provided a method of toughening glass sheets in which hot sheets of glass are supported on a gaseous support as they are advanced through an initial quenching stage, and thereafter when the under face of the glass is no longer deformable the glass is mechanically supported as it is further advanced through a final quenching stage.

Because the glass is mechanically supported during that part of the quenching when the glass can shatter the final quenching stage is designed with an open structure so as to allow shattered glass to fall out of the path of travel of the succeeding sheet of glass and to permit ease of clearance of cullet.

The use of quenching in two stages according to the invention permits the final quenching stage to be supplied with cooling air at a higher pressure than the initial quenching stage.

The invention also comprehends apparatus for use in toughening glass sheets comprising two complementary quenching beds forming an initial quenching stage, between which beds hot glass sheets are advanced, means for supplying cooling air through said quenching beds to constitute two gaseous cushions formed between each advancing sheet of glass and the beds, the lower gaseous cushion acting as a support for the sheet, a final quenching stage following the initial stage comprising two quenching boxes having a plurality of uniformly spaced gas release nozzles projecting from the boxes towards the path of travel of the glass sheets, and mechanical conveying means associated with the boxes for advancing the glass sheets between the sets of gas release nozzles.

In a preferred embodiment of the invention the nozzles upstanding from the lower of the final quenching stage are of conical form tapering upwardly so that dice of glass resulting from the shattering of a sheet being quenched in the final quenching stage can fall away from the path of travel of the glass into the space between the nozzles without impeding the upward flow of quenching air.

DESCRIPTION OF THE PREFERRED EMBODIMENT

Figure 1:
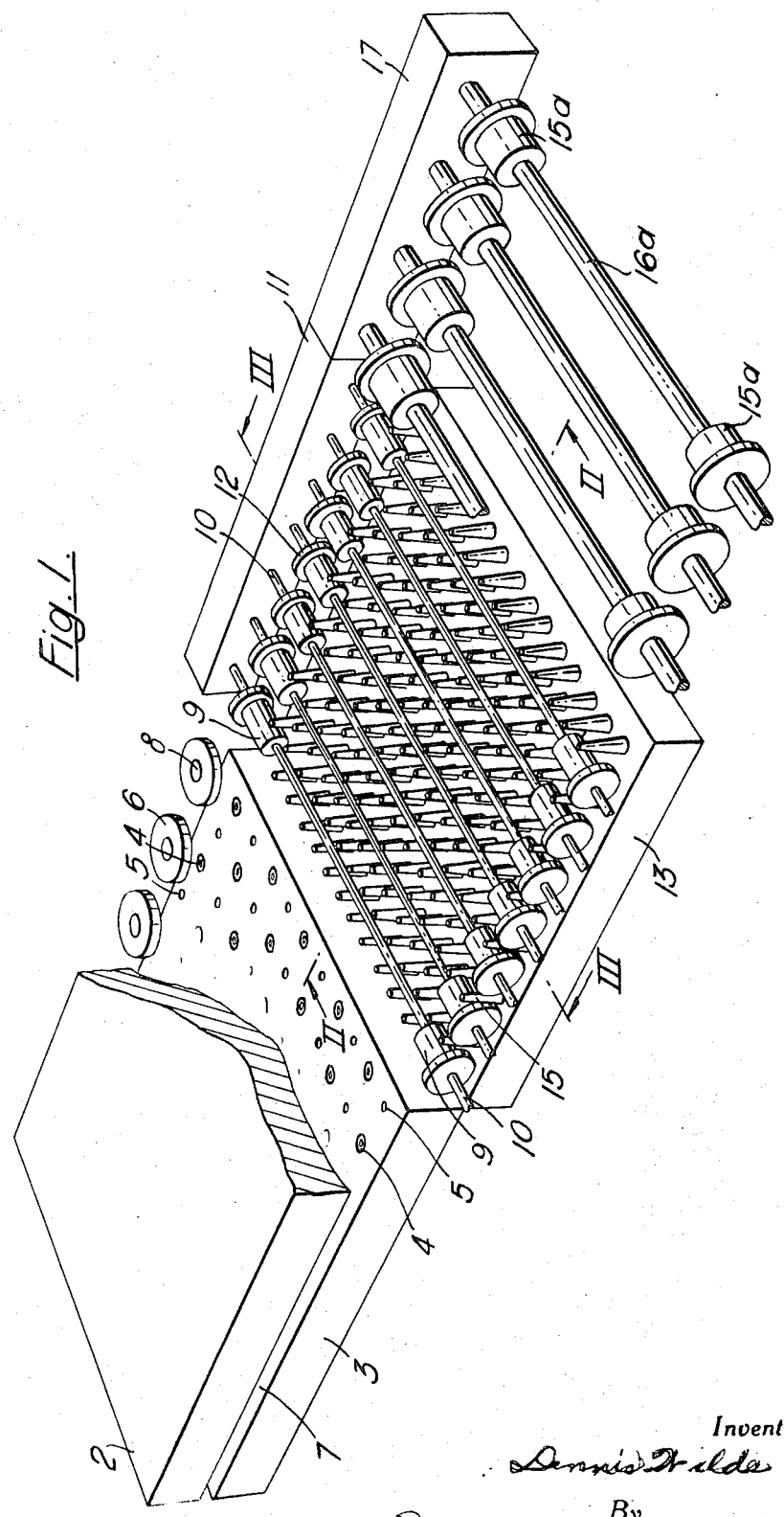
FIG. 1 is a perspective view, partly in section, of the lower part of the apparatus for carrying out the method of toughening glass sheets according to the invention.
Figure 2:
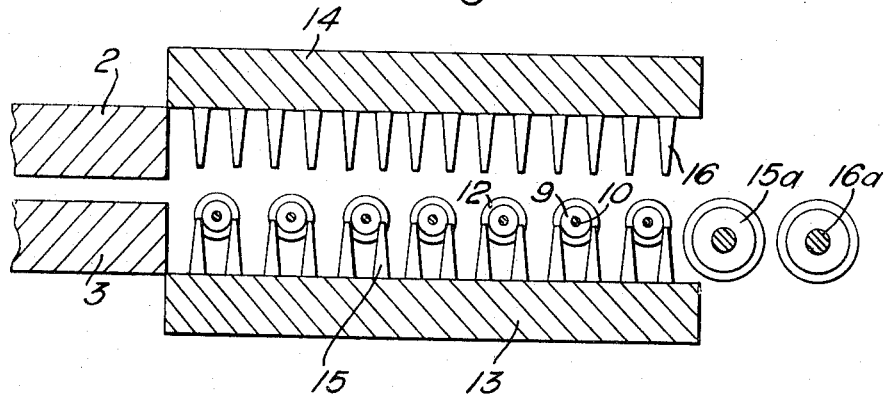
FIG. 2 is a longitudinal section through a part of the apparatus of FIG. 1 on line II—II of FIG. 1.

Referring to the drawings which show apparatus for toughening sheets of flat glass which have already been heated while being advanced over a gaseous support through heating stations. The hot sheets of glass, which are above their deformation temperature, advance between two quenching beds generally indicated by the references 2 and 3. Both beds are supplied with cooling air under pressure.

Over the lower bed 3 there is developed by an advancing sheet of glass a gaseous support for the advancing hot sheet, the upper surface of the bed 3 being provided with gas supply apertures 4 uniformly distributed over the bed 3. These apertures are aligned as shown in FIG. 1 at a small angle to the direction of advance of the glass and cooling air escapes from the apertures 4 to form a layer of gas over the bed surface which creates a gaseous support beneath hot glass sheets as they are advanced between the two beds 2 and 3.

Uniformly interspersed between the gas supply apertures 4 are exhaust apertures 5 through which spent gases are exhausted from the layer of gas.

Figure 3:
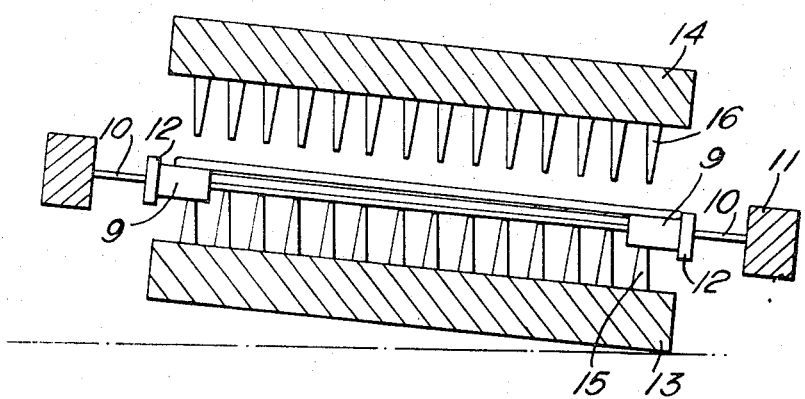
FIG. 3 is a transverse section on the line III—III of FIG. 1.

Although not shown in the drawings the lower face of the upper bed 2 is similarly formed with gas supply apertures and exhaust apertures so that there is a continuously replenished layer of cooling air over the top surface of the advancing hot sheets of glass and the upper and lower surfaces of the glass are quenched at the same rate. In order to advance the sheets of glass between the beds 2 and 3 edge drive discs 6 disposed in the plane of the upper surface 7 of the bed 3 are provided, being mounted on spindles 8. One edge of the hot glass may contact these discs so that the speed of advance of the hot glass between the beds 2 and 3 is regulated. Alternatively the discs may be free running to act as guides for the glass which is advancing over the gaseous support under its own momentum. As shown in FIG. 3, the apparatus is inclined at a small angle to the horizontal and this tends to cause the sheets of glass to run with one side edge against the discs 6.

By the time it emerges from the initial quenching stage defined between the two beds 2 and 3 the glass is quenched to a condition in which its under face is no longer deformable and when the glass reaches this condition the strains in the glass are such that the glass may shatter and resulting cullet fall under gravity on to the lower part of the quenching stage in the form of small dice.

The glass in this lightly-quenched condition is advanced to a final quenching stage and because the under surface of the glass is no longer deformable the glass can be mechanically supported on conveyor rollers without marring the undersurface of the glass. These rollers are, in the illustrated embodiment, asbestos side rolls 9 mounted on spindles 10 which are driven from one end through drive gearing indicated generally at 11. The spindles 10 are inclined at the same small angle to the horizontal as the surface of the beds 2 and 3 as indicated in FIG. 3. Each of the side rolls is provided with a collar 12 so as to preclude the possibility of sheets of glass slipping over the edges of the side rolls.

The length of the side rolls 9 is such as to only contact the minimum amount of the surface of the glass necessary to give the desired forward movement to the glass between two quenching boxes 13 and 14 of the final quenching stage so that the flow of quenching air is not unduly impeded. Each of the quenching boxes 13 and 14 is provided with a forest of uniformly spaced gas release nozzles, respectively 15 and 16, projecting from the boxes towards the path of travel of the glass sheets through which nozzles quenching air is directed at the surfaces of the glass on the conveyor rollers. The upper and lower quenching boxes with their nozzles are of the same design and the nozzles of the lower box stand up from the surface of the box 13 so that any cullet resulting from shattering of a glass sheet while it is supported on the rolls 9, falls down between the nozzles and can be easily raked or blown off the top surface of the box 13. The nozzles are of conical shape, tapering upwardly, and so the possibility of any cullet lodging in the nozzles is reduced to a minimum and the falling of shattered glass into the space between the nozzles is facilitated. This open structure of the quenching boxes permits cullet to be cleared easily and also the open structure provides space for the shattered dice from two or even three sheets of glass so that the cullet does not have to be cleared each time a sheet shatters. This open structure further permits spent quenching gases to exhaust clear of the apparatus very rapidly.

The conveyor rollers in the final quenching stage may be driven at a rate so that there is an acceleration of the glass during its advance between the two quenching boxes 13 and 14. Because at this final quenching stage the surfaces of the glass are no longer deformable, quenching gas may be supplied at a higher pressure than the gas supplied to the layers of glass formed between the beds 2 and 3 and the glass sheets. From the final quenching stage the glass passes on to further conveyor rollers comprising side rolls 15a mounted on spindles 16a and driven through gearing 17 and the cooled toughened glass sheets on these rollers can be lifted at an unloading station and stacked for warehousing.

Curved sheets of glass can be toughened by the method of the invention by shaping the beds 2 and 3 to have complementary shapes corresponding to the curved shape of the sheets of hot glass advanced between these beds. By the time the curved glass sheets reach the final quenching stage they hold their form and the side edges of the sheets are supported on the side rolls 9 with the sheet bowed upwardly between those edges. The gnerally flat quenching boxes 13 and 14 may still be employed as long as they are sufficiently far apart to permit the passage of the curved sheets, but if desired, the nozzles can be of variable height following the curve of the glass and are arranged for example so that nozzles in the central region of the lower box 13 protrude above the level of the spindles 10. The ends of the nozzles depending from the upper box 14 are arranged to lie on a complementary surface to accommodate the curved glass sheets.

The invention thus provides a novel arrangement for the toughening of glass sheets which are supported on a gaseous support which ensures that at the stage in the toughening process where the glass may shatter provision is made for ready removal of cullet formed by shattering of the glass without holding up the advance of the glass sheets through the quenching apparatus.

I claim:

1. In the art of toughening glass sheets, apparatus comprising:
   a. two complementary horizontally-disposed, perforated beds defining therebetween an interspace for passage of each hot glass sheet between the beds, said beds defining a partial quenching zone having an inlet receiving each glass sheet from a furnace for heating the glass sheets whereby the glass is ready for quenching, said beds being closely spaced and the perforations of the beds being close together to provide gaseous support for the glass sheets without mechanical support means,
   b. means for supplying cooling gas through the beds for release through the perforations therein into the interspace, the cooling gas supplied through the lower one of said beds forming a supporting gaseous cushion beneath each advancing sheet,
   c. glass sheet advancing means associated with said horizontally disposed beds for advancing each gas-supported hot glass sheet through said interspace towards an outlet therefrom at a rate sufficient to effect partial cooling of each glass sheet and quenching of the upper and lower surfaces of the glass sheet only to a condition in which they no longer are deformable,
   d. mechanical conveying means extending from said outlet and aligned with said interspace and including spaced-apart side rollers for marginally supporting and advancing each glass sheet beyond said outlet,
   e. a quenching box mounted below said conveying means and having a plurality of vertically elongate upstanding gas release nozzles which are spaced with respect to said conveying means and to each other so as to provide clearance space for shattered glass fragments therearound which permits unimpeded upward flows of quenching gas therefrom without providing support of the glass sheet by a gaseous cushion, and
   f. a complementary quenching box mounted above said conveying means and having uniformly spaced gas release nozzles directed downwardly towards said conveying means, said quenching boxes defining a final quenching zone.

2. Apparatus according to claim 1, wherein the nozzles upstanding from the lower quenching box are of conical form tapering upwardly and spaced with respect to each other to provide said clearance space.

3. Apparatus according to claim 1 wherein said beds each are provided with cooling gas supply apertures and cooling gas exhaust apertures, said supply apertures being uniformly distributed throughout said beds and said exhaust apertures being uniformly interspersed between said supply apertures.

* * * * *